(12) United States Patent
Bhattacharyya et al.

(10) Patent No.: US 11,178,540 B2
(45) Date of Patent: Nov. 16, 2021

(54) ENABLING SECURE BEACON TELEMETRY BROADCASTS BASED ON BATTERY POWER STATE OF A BEACON DEVICE

(71) Applicant: Cisco Technology, Inc., San Jose, CA (US)

(72) Inventors: Abhishek Bhattacharyya, Fremont, CA (US); Nancy Cam-Winget, Mountain View, CA (US); Jagdish Girimaji, Pleasanton, CA (US); Rahul Dasgupta, San Jose, CA (US); Damodharam Ammepalli, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 305 days.

(21) Appl. No.: 16/223,573

(22) Filed: Dec. 18, 2018

(65) Prior Publication Data

US 2020/0137563 A1    Apr. 30, 2020

Related U.S. Application Data

(60) Provisional application No. 62/753,402, filed on Oct. 31, 2018.

(51) Int. Cl.
*H04W 12/08* (2021.01)
*H04W 12/00* (2021.01)
(Continued)

(52) U.S. Cl.
CPC ......... *H04W 12/009* (2019.01); *H04W 24/10* (2013.01); *H04W 76/10* (2018.02); *H04W 12/043* (2021.01); *H04W 84/18* (2013.01)

(58) Field of Classification Search
CPC ............ H04L 63/062; H04L 63/1425; H04W 12/122; H04W 12/009; H04W 76/10; H04W 24/10; H04W 84/18; H04W 12/043
(Continued)

(56) References Cited

U.S. PATENT DOCUMENTS 8,069,483 B1 * 11/2011 Matlock .............. H04W 12/126
726/23
9,043,602 B1 * 5/2015 Krieger ................. H04L 63/123
713/181
(Continued)

FOREIGN PATENT DOCUMENTS

EP      2650692 A1    10/2013

OTHER PUBLICATIONS

Hemant Chaskar, "IoT Security Using BLE Encryption", Dec. 27, 2018, 10 pages.
(Continued)

*Primary Examiner* — Haresh N Patel
(74) *Attorney, Agent, or Firm* — Edell, Shapiro & Finnan, LLC

(57) ABSTRACT

In accordance with one aspect, presented herein is a method to encrypt beacon device telemetry broadcast packets while respecting the low power and low processing requirements inherent to wireless beacon devices and various other challenges which such an encryption scheme brings. In accordance with another aspect, a methodology is provided through which the network can identify if an unauthorized connection is being established with a beacon device and thereby prevent potential beacon device tampering.

20 Claims, 8 Drawing Sheets

(51) Int. Cl.
*H04W 76/10* (2018.01)
*H04W 24/10* (2009.01)
*H04W 64/00* (2009.01)
*H04W 84/18* (2009.01)
*H04W 12/043* (2021.01)

(58) Field of Classification Search
USPC .......................................................... 726/4
See application file for complete search history.

(56) References Cited

U.S. PATENT DOCUMENTS

| | | | |
|---|---|---|---|
| 9,801,059 B2 | 10/2017 | Ziv et al. | |
| 9,832,194 B2 | 11/2017 | Krieger et al. | |
| 10,117,078 B1* | 10/2018 | Mendelson | G01S 5/0231 |
| 10,219,106 B1* | 2/2019 | Lam | H04W 12/108 |
| 2007/0201540 A1* | 8/2007 | Berkman | H04B 3/542 |
| | | | 375/219 |
| 2007/0248232 A1 | 10/2007 | Driscoll et al. | |
| 2010/0299519 A1* | 11/2010 | Xiao | H04L 63/061 |
| | | | 713/155 |
| 2011/0178933 A1* | 7/2011 | Bailey, Jr. | H04L 63/20 |
| | | | 705/71 |
| 2015/0030158 A1 | 1/2015 | Noda | |
| 2015/0312722 A1* | 10/2015 | Mori | G01S 11/06 |
| | | | 455/456.3 |
| 2016/0063476 A1* | 3/2016 | Baldie | G06Q 20/40 |
| | | | 705/44 |
| 2016/0100310 A1* | 4/2016 | Lee | H04W 12/50 |
| | | | 713/171 |
| 2016/0306750 A1* | 10/2016 | Tucker | H04L 9/0869 |
| 2017/0026349 A1* | 1/2017 | Smith | H04L 63/0428 |
| 2018/0132183 A1* | 5/2018 | Gattu | G05B 15/02 |
| 2018/0145834 A1* | 5/2018 | Dharankar | H04L 63/06 |
| 2018/0176079 A1* | 6/2018 | Teo | H04W 76/15 |
| 2018/0212773 A1* | 7/2018 | Kushnirsky | H04L 9/0891 |
| 2018/0324547 A1* | 11/2018 | Biehl | H04W 12/61 |
| 2019/0007223 A1* | 1/2019 | Vaidya | H04L 9/0618 |
| 2019/0028952 A1* | 1/2019 | Shah | H04W 40/24 |
| 2019/0116173 A1* | 4/2019 | Robison | H04L 63/0823 |
| 2019/0297574 A1* | 9/2019 | Choi | H04L 61/2553 |

OTHER PUBLICATIONS

Elexo, "Bluetooth low energy Security", downloaded Oct. 3, 2018, 43 pages.
Allen Huotari, "Bluetooth Low Energy (BLE) Beacon Monitoring (Detection, Location, and Reporting)", Jun. 5, 2015, 2 pages.
Extended European Search Report in counterpart European Application No. 19205689.3, dated Feb. 20, 2020, 9 pages.
Seitz, L. et al., "Authentication and Authorization for Constrained Environments (ACE) using the OAuth 2.0 Framework (ACE-OAuth) draft-ietf-ace-oauth-authz-16", ACE Working Group, Oct. 2, 2018, 70 pages.

* cited by examiner

700

710 OBTAINING FROM A PLURALITY OF WIRELESS ACCESS POINTS THAT DETECT CONNECTION REQUESTS TO THE AT LEAST ONE WIRELESS BEACON DEVICE, REPORTS INCLUDING A MEDIA ACCESS CONTROL ADDRESS FOR A SOURCE AND DESTINATION OF DETECTED CONNECTION REQUESTS

720 DETERMINING WHETHER THE MEDIA ACCESS CONTROL ADDRESS ASSOCIATED WITH A DETECTED CONNECTION REQUEST IS ASSOCIATED WITH A WIRELESS ACCESS POINT NOT AUTHORIZED TO CONNECT TO THE AT LEAST ONE WIRELESS BEACON DEVICE

730 GENERATING A ROGUE DEVICE DETECTION ALERT BASED ON A DETECTED CONNECTION REQUEST DETERMINED NOT TO BE ASSOCIATED WITH A WIRELESS ACCESS POINT AUTHORIZED TO CONNECT TO THE AT LEAST ONE WIRELESS BEACON DEVICE

FIG.7

ENABLING SECURE BEACON TELEMETRY BROADCASTS BASED ON BATTERY POWER STATE OF A BEACON DEVICE

PRIORITY CLAIM

This application claims priority to U.S. Provisional Application No. 62/753,402, filed Oct. 31, 2018, the entirety of which is incorporated herein by reference.

TECHNICAL FIELD

The present disclosure relates to wireless communication networks.

BACKGROUND

Wireless beacons may be battery powered Bluetooth® Low Energy (BLE) devices that broadcast advertising data in a certain format (e.g., iBeacon™, Eddystone™, and AltBeacon) or broadcast sensor readings such as temperature, humidity, Global Positioning System (GPS) location, oxygen pump levels, heart rates etc., usually in clear text for consuming devices in proximity to receive. In most practical implementations, BLE telemetry broadcasts are unencrypted. However, in some cases the sensor telemetry broadcasts are encrypted with an identity key, such as encrypted Eddystone telemetry frame (TLM) with Eddystone Encrypted ID profile (EID).

Encrypting the entire broadcast payload or leaving the entire broadcast payload in clear text are both non-optimal. A portion of the payload needs to be unencrypted to convey metadata, such as the priority of the packet, so that all intermediate hop devices can prioritize the packet transmission until it reaches its destination, while a portion of the payload needs to be encrypted so that only the destination system/device that is supposed to consume the data can decrypt and read the information. In addition, unlike point-to-point encryption, the encrypted packet needs to be decrypted only at a central source, namely a cloud service, several hops away from the data source, to ensure confidentiality of the data transmitted. This introduces challenges in current Bluetooth or Wi-Fi® encryption protocols.

BRIEF DESCRIPTION OF THE DRAWINGS

FIG. 7 is a flow chart depicting operations performed by the management server to detect unauthorized connection attempts to a beacon device, according to an example embodiment.

DESCRIPTION OF EXAMPLE EMBODIMENTS

Overview

In accordance with one aspect, presented herein is a method to enable encryption of beacon telemetry broadcast packets while respecting the low power and low processing requirements inherent to beacon devices and various other challenges which such an encryption scheme brings. A server is provided that manages at least one wireless beacon device configured to encrypt and broadcast telemetry messages that include data from one or more sensors. The server obtains information about battery power state of the at least one wireless beacon device. The server controls distribution of encryption keys to the at least one wireless beacon device based on the battery power state of the beacon device so as to minimize battery power consumption of the at least one wireless beacon device.

In accordance with another aspect, a method is provided through which the network can identify if an unauthorized connection is being established with a beacon in the overlay and thereby prevent potential beacon tampering. The server obtains, from a plurality of wireless access points that detect connection requests to the at least one wireless beacon device, reports including a media access control address for a source and a destination of the detected connection requests. The server determines whether the media access control address associated with a detected connection request is associated with a wireless access point not authorized to connect to the at least one wireless beacon device. The server generates a rogue device detection alert based on a detected connection request determined not to be associated with a wireless access point authorized to connect to the at least one wireless beacon device. In a further variation, the server may obtain from a wireless access point that is in communication with the at least one wireless beacon device, an indication that a panic telemetry signal has been transmitted by the at least one wireless beacon device, the panic telemetry signal indicating that a key agreement protocol exchange associated with a connection request to the at least one wireless beacon device has failed a predetermined number of times, wherein the panic telemetry signal is broadcasted by the at least one wireless beacon device in clear text. In this case, the server may generate the rogue device detection alert based further on occurrence of the panic telemetry signal.

Example Embodiments

Figure 1:
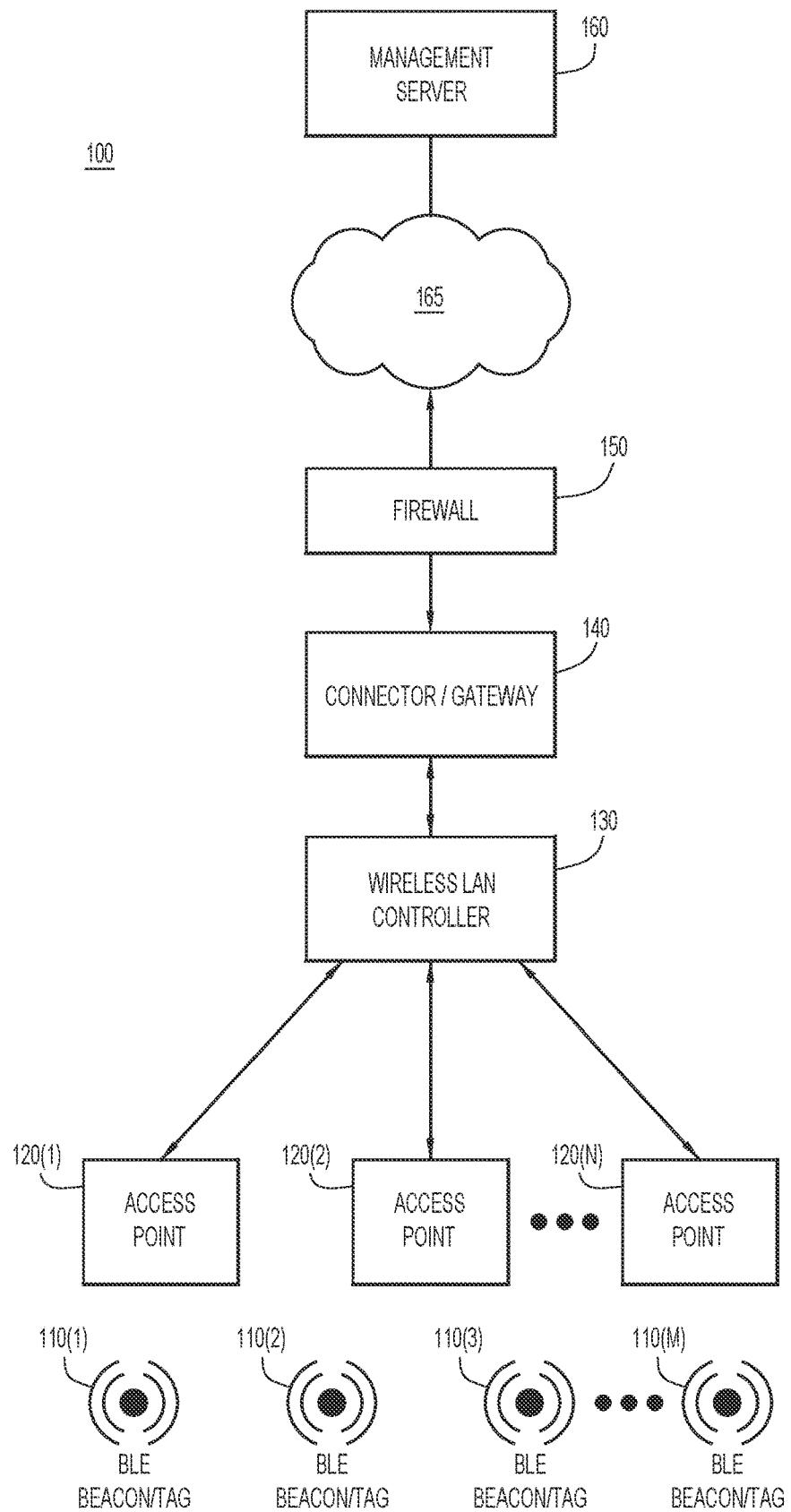
FIG. 1 is a block diagram of a communication system in which communications with one or more beacon devices are managed, according to an example embodiment.

Reference is first made to FIG. 1. FIG. 1 shows a system 100 that includes a plurality of beacon devices (denoted BLE beacon/tag) 110(1)-110(M), a plurality of wireless local area network (WLAN) access points (APs) 120(1)-120(N), a wireless LAN controller 130, a connector/gateway apparatus 140, a firewall 150 and a management server 160 that has connectivity to the connector/gateway 140 via a wide area network (Internet) 165 and the firewall 150. The APs 120(1)-120(N) are capable of WLAN communication, such as Wi-Fi® communication as well as wirelessly communicating with the beacon devices 110(1)-110(M) using the appropriate protocol, such as the Bluetooth® wireless communication protocol, and in particular the Bluetooth Low Energy (BLE) protocol.

The management server 160 manages operation of the beacon devices 110(1)-110(M) by sending commands/controls through the WLAN controller 130 and APs 120(1)-120(N). In accordance with embodiments presented herein, methods are presented herein to secure the telemetry broadcasts of the beacon devices 110(1)-110(M). The telemetry data is encrypted in multiple phases.

When a beacon device is manufactured, the beacon manufacturer programs a key (henceforth referred to as a connection key) into the beacon device. This key, called a "PSK-ID/BLE," is unique per beacon device. The beacon manufacturer/vendor then informs the management server/service 160 (e.g., through a secure Representational State Transfer (REST) endpoint) about the particular connection key that has been programmed into a particular beacon device with a corresponding media access control (MAC) address. Thus, there is another secure connection between the vendor and the management server/service 160 and REST is one example.

Thus, both the beacon device 110(1)-110(M) and the management server 160 have a pre-shared key for a given beacon device. Using this pre-shared key and an established authentication protocol used in the Bluetooth standard, called Secure LE, the management server 160 establishes a secure connection with a beacon device. Once this secure connection is established, techniques presented herein distribute keys in an intelligent manner so as to ensure integrity of the telemetry broadcasts from the beacon devices.

In the sequence diagrams described herein, the flow of messages through the WLAN controller 130 is omitted only for simplicity. It is to be understood that many or all messages from the APs 120(1)-120(N) flow through the WLAN controller 130 in order to reach the management server 160.

Beacon Onboarding

Figure 2:
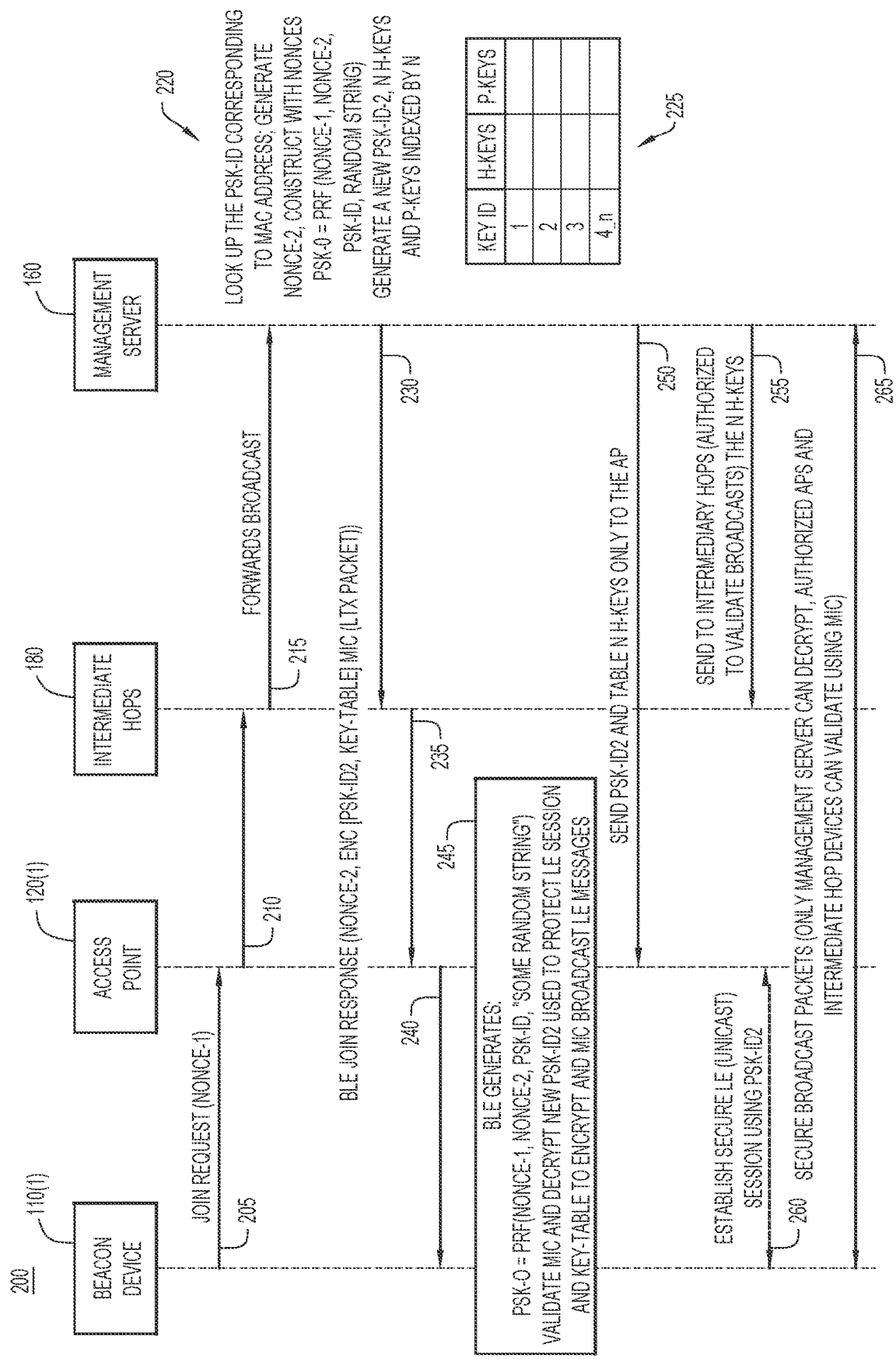
FIG. 2 is a sequence diagram showing messages exchanged to provision beacon devices, access points and intermediate hop devices with keys, according to an example embodiment.

Reference is now made to FIG. 2. FIG. 2 shows a sequence diagram of a process 200 for onboarding a beacon device according to the embodiments presented herein. Reference is also made to FIG. 1 for purposes of describing the process 200. The process 200 shown in FIG. 2 includes, as an example, messages sent by a beacon device 110(1), AP 120(1), various intermediate hop devices denoted by reference numeral 180, and the management server 160.

When a customer buys a beacon device, the customer brings the beacon device to a secure location and turns on the beacon device. At 205, when a beacon device is turned on, it broadcasts an unencrypted advertisement (Join Request (Nonce-1)), which when received and decoded (parsed), provides the wireless infrastructure (consisting of the AP 120(1) that receives the advertisement, the WLAN controller 130, and the management server 160) information about the MAC address of the beacon device 110(1) and the manufacturer of the beacon device 110(1). As shown at 210 and 215, the AP 120(1) that receives the join request advertisement 205 forwards it via one or more intermedia hop devices 180 to the management server 160. Since the join request advertisement 205 is unencrypted, this information is publicly available.

When the management server 160 obtains the beacon device MAC address from the join request advertisement 205, at 220, the management server 160 determines the capabilities of the beacon device (based on the MAC address) to ensure the appropriate security configuration (e.g., key size and cryptographic algorithm) to provision the beacon device using the connection key (PSK-ID) corresponding to the MAC address obtained from a database. As shown in FIG. 2, the management server generates and maintains a key-table 225 (also called key-ID table) that consist of hash keys (H-keys) and encryption keys (P-keys) indexed by a key-ID. The key-table stores multiple keys generated by the management server 160 and indexed by a key-ID. The keys do not need to be rotated frequently. Each key has a broadcast key identifier and using this key identifier, the AP will know which key to use to validate the MIC, while the management server 160 will know which key to use to decrypt and recover the data contained in telemetry broadcast from a beacon device.

At 230, the management server securely transmits a BLE Join Response that includes this information to the AP 120(1) along with a secure passkey it generates. Specifically, the BLE Join Response includes Nonce-2, encrypted (PSK-ID2 and key-table) and a Message Integrity Code (MIC). At 235, the intermediate hop devices 180 forward the BLE Join Response to the AP 120(1). AP 120(1) receives the BLE Join Response via one or more intermediate hops 180, and at 240, the AP 120(1) forwards the BLE Join Response to the beacon device 110(1).

At 245, the beacon device 110 recovers from the BLE Join Response, PRF (Nonce-1, Nonce-2, PSK-ID, random string), validates the MIC and decrypts the new PSK-ID2 that it uses to protect LE session messages, and uses the key-table 225 to encrypt LE messages and the MIC for broadcasting LE messages. PRF is a Pseudo Random Function.

The AP 120(1) validates the beacon identity using the connection key in a 4-way handshake using the secure BLE connection (https://blog.bluetooth.com/bluetooth-pairing-part-4) and rotates the connection key to establish the secure passkey. In this process, the connection key is never sent over the air and it is resistant to a main-in-the-middle (MITM) attack. Once the connection key is rotated successfully and a passkey is established, the AP 120(1) sends a confirmation to the management server 160 to use the passkey for future connections with the beacon device 110(1). The passkey is not stored by the AP 120(1).

At 250, the management server 160 sends the PSK-ID2 and key-table 225 (that includes the H-keys) only to the AP 120(1), that is, only to the AP that receives the transmissions from the beacon 110(1).

At 255, the management server 160 sends the N H-keys to the intermediate hop devices 180 that are authorized to validate broadcasts from the beacon device 110(1).

At 260, the beacon device 110(1) and its serving AP 120(1) establish a secure LE (e.g., unicast) session using the PSK-ID2. At this point, the LE channel (unicast channel) is now secure between the edge (AP 120(1)) and the beacon 110(1).

Thereafter, as shown at 265, the beacon device 110(1) can send secure (BLE) broadcast packets and only the management server 160 can decrypt those packets. The authorized AP 120(1) and intermediate hop devices 180 can validate the MIC using one of the key-pairs indexed by the key-ID.

Beacon Telemetry Key Setup

In accordance with the embodiments presented herein, the management server 160 distributes keys in such a way so as to take into consideration beacon device power (power-aware), beacon device location (location-aware), and topology of the beacon deployment.

Once the passkey is received, the management server 160 generates:

1. A set of hash keys (H-keys) for either all APs in the system or all APs on a floor of a deployment site, depending on the level of security desired and the power requirements of the beacons. Again, the hash keys are used for integrity validation of a telemetry packet transmitted from a beacon device at the edge of the network.

2. A set of broadcast key sets per beacon device. Each broadcast key set is a combination of a key-ID and an encryption key. The beacon device uses the encryption key for encryption of the telemetry payload of the beacon and decryption of the payload by the cloud.

The management server 160 performs a one-to-one mapping to create key sets comprising a key-ID, an encryption key and a hash key. The number of keys in the key set may be determined using Table 1 below, in one example.

Multiple broadcast keysets are generated at one time for each beacon, so that the broadcast keys do not need to be rotated very frequently to conserve beacon device battery power.

The management server 160 sends the key sets along with the passkey to the AP 120(1). The AP saves the hash keys and the key-IDs but does not save the passkey or the broadcast encryption keys. The AP 120(1) then establishes a secure LE connection with the beacon device 110(1) using the passkey and sends over the key sets in their entirety to the beacon over the secure channel.

Secure Beacon Telemetry

A beacon device therefore stores the following keys;

1. A passkey to validate and establish secure LE connections with an AP.

2. Key sets with each key set comprising of (key-ID, encryption key, hash key)

The beacon device encrypts telemetry packets with one randomly selected triplet from the key set.

Figure 3:
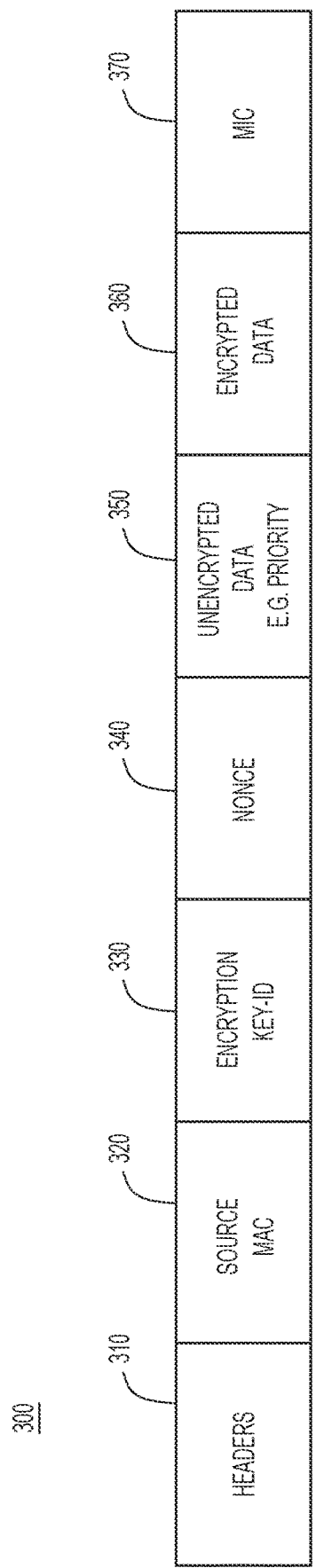
FIG. 3 is a diagram of a beacon telemetry packet and illustrating various fields including an encrypted portion for beacon payload data and an unencrypted portion for routing priority information, according to an example embodiment.

Reference is now made to FIG. 3. FIG. 3 illustrates a telemetry packet 300. The telemetry packet includes a field 310 for router headers, source MAC address field 320, encryption Key-ID field 330, nonce field 340, unencrypted data field 350 (to carry information such as routing priority information), encrypted data field 360 for the beacon device payload and a MIC field 370. The telemetry payload is encrypted with the encryption key and the key-ID is inserted into the packet in the encryption Key-ID field 330. The nonce field 340 includes the nonce to provide replay protection at the edge. The entire packet is then hashed with a corresponding hash key and the MIC is inserted into the MIC field 370 of the packet 300.

Integrity Check at the Edge

When an AP receives a telemetry packet from a beacon device, it uses the hash key corresponding to the key-ID to verify the MIC and this message integrity is checked at the edge. The AP then verifies the nonce to ensure that it is not a retransmitted packet. The AP then forwards the packet upstream to the management server 160 based on the priority set in the unencrypted portion (field 350) of the packet 300.

Decryption at the Cloud

On receiving the message, the management server 160 extracts the encryption key-ID and the source MAC address for the packet. Based on this information, the management server 160 retrieves the decryption key and decrypts the transmitted payload contained in field 360 of the packet.

Key Rotation

The management server 160 rotates the broadcast key and the hash key periodically rotated (e.g., every 6 days or at some other frequency) to ensure the keys are not compromised.

The encryption scheme is power-aware. The management server 160 routinely generates, batches and rotates the broadcast encryption keys and the hash keys in such a fashion that (a) the beacon devices are not drained of battery in the act of rotating keys regularly, and (b) the attack surface to break the keys is not compromised.

As explained above in connection with FIG. 3, the system allows the telemetry packet payload to have a portion of it encrypted and a portion of it unencrypted. The unencrypted portion (field 350) can be used to determine packet priority, thus addressing telemetry broadcasts which have emergency information, such as low heart rates. Since the priority is in clear text, all intermediate packet hops can prioritize the packet.

Additionally, the system ensures confidentiality in the cloud. All the encryption keys are generated and stored entirely by a management server 160. As a result, the encrypted portion of the telemetry data can only be decrypted at the management server 160 and not at any intermediate hop.

Further still, the system ensures message integrity at the edge. Although a portion of the packet is unencrypted, the system protects against packet manipulation and retransmission attacks by intelligently disseminating hash keys and checking message integrity at the edge APs.

Figure 4:
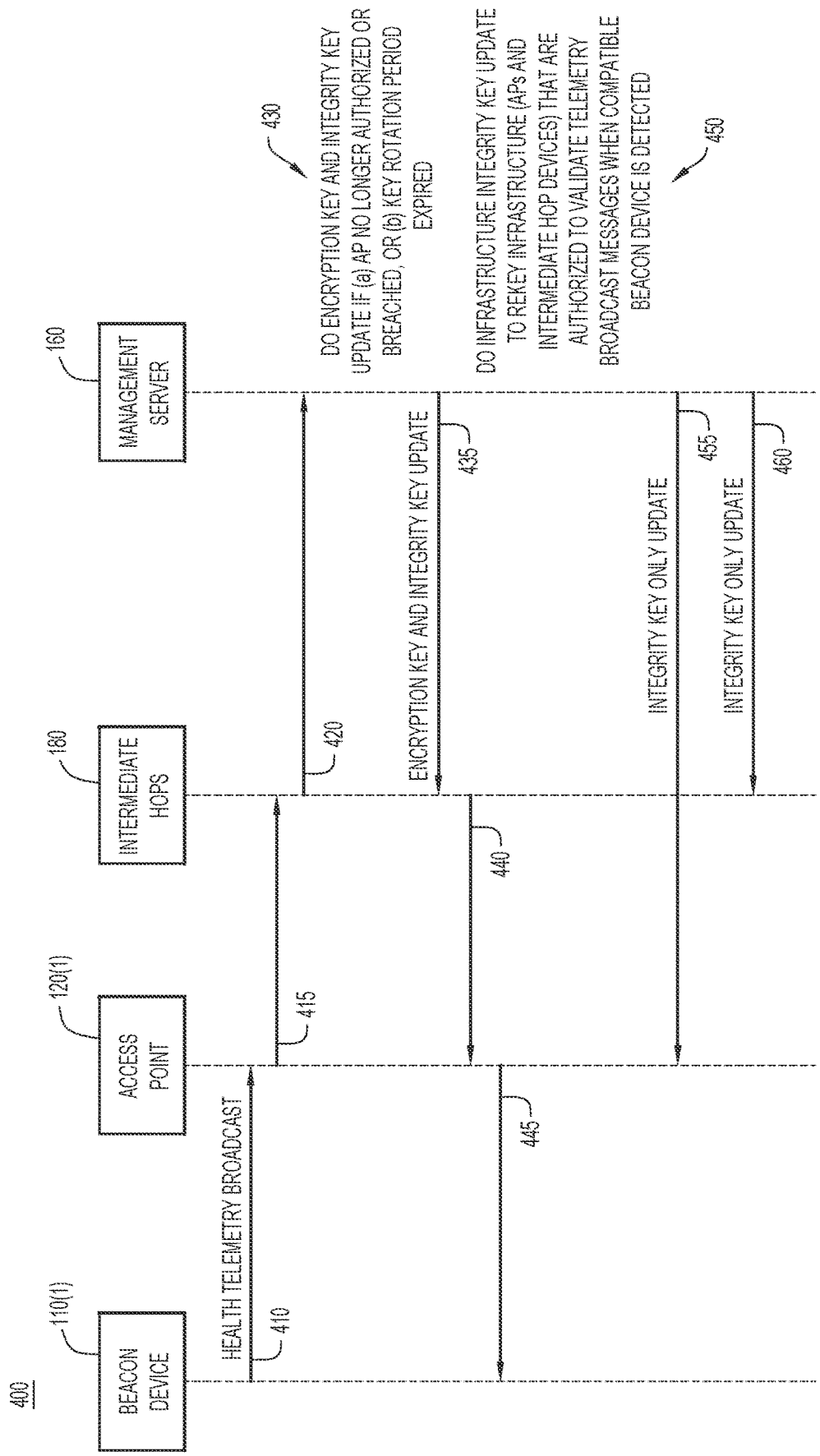
FIG. 4 is a sequence diagram depicting a process to manage key distribution to beacon devices, access points and intermediate hop devices, according to an example embodiment.

Reference is now made to FIG. 4. Reference is also made to FIG. 1 for purposes of the description of FIG. 4. FIG. 4 shows a sequence diagram for a process 400 by which the management server 160, in disseminating keys, does so in order to respect the power constraints of the beacon devices. More specifically, the mechanism ensures that the key rotation is achieved at a frequency that minimizes power consumption of the beacon devices. When the management server 160 detects the power usage and remaining life of the beacon device, the management server 160 adjusts/controls the key management so as to optimize/minimize power consumption due to key rotation. An AP, such as AP 120(1), uses the secure LE unicast channel to send a key-table to the beacon device at the appropriate rotation period/interval.

There is a periodicity by which the key used by a beacon device should be changed. To be respectful of, and minimize the battery consumption needed by a beacon device to transmit the new keys to the beacon device, the management server 160 can use knowledge of the battery power state of the beacon device. As shown at 410 in FIG. 4, the beacon device 110(1) sends a health telemetry broadcast in which a field of a telemetry broadcast packet (in the payload) is used to indicate the battery power level of the beacon device. The broadcast is forwarded by the AP 120(1) at 415 and the intermediate hop devices 180 at 420 to the management server 160. Alternatively, the management server 160 can use its secure connection with the beacon device to query the beacon device to report its battery power state.

Using the battery power level/state information reported to the management server 160, the management server 160 can determine how beacon device is draining power, i.e., how much power the beacon device currently has. The management server 160 can adjust how it distributes keys to the beacon device based on its power state. Specifically, the management server 160 can use the battery power state information to determine how frequently to rotate keys without significantly affecting encryption guarantees. For example, based on the battery power state of the beacon device, instead of distributing two keys every 5 minutes, the management server may determine it should distribute a larger set of keys every 30 minutes, to reduce battery consumption by the beacon device for key management.

Assuming a 20 msec telemetry broadcast rate and a 1 Mbps throughput, Table 1 below sets forth possible key rotation periods.

| Battery Level (days) | Key Table Size | Key Rotation Period |
|---|---|---|
| 50-100% | 2 | 6 |
| 25-50% | 4 | 12 |
| 0-25% | 8 | 48 |

At 430, the management server 160 determines whether it needs to do a key update based on either (a) an AP is not authorized or breached or (b) the key rotation has expired. The key rotation period can be dynamically adjusted based on the battery power state of the beacon, as described above. When either of these conditions is met, then at 435, the management server 160 initiates a key update for both the encryption key and integrity key(s), and this is forwarded at 440 by the intermediate hop devices 180 and at 445 by the AP 120(1) to the beacon device 110(1).

The key update may be a BLE key update that takes the form of (Nonce-2, ENC (key-table), and MIC. Optionally, the key update may include PSK-IDs revoked from old APs, where ENC is an encryption operation.

Topology awareness key management is another aspect of these techniques. The management server 160, based on a location of beacon device, knows which AP(s) should be in the range of that beacon (using location and signal strength measurements) which are authorized to be able to validate the broadcast beacon device messages from that beacon device. The management server 160 can determine which hash keys to distribute to the APs based on the beacon location and network topology. In a trivial case, all APs and beacon devices can have the same hash key. In a slightly advanced case, all APs and beacon devices on a building floor can share the same hash key. In a more advanced scenario, only the AP determined to be in a closest proximity of the location of the beacon device and the one-hop neighbors of that AP, would be initially provided with the hash key. As more and more APs report detecting advertisements from that beacon device, those additional APs may be distributed the hash keys as well. Thus, only a subset of the APs on a building floor would have the hash keys to perform the necessary integrity check for the beacon telemetry.

If a beacon device is moved, the authorized devices in the infrastructure may change. The management server 160, based on a policy, may revoke the keys or update them to ensure the newly unauthorized devices can no longer validate the beacon device that has moved.

Once the management server 160 knows which APs are authorized (and knows that the beacon device is authorized), the management server 160 can distribute to the beacon device the correct set of key pairings to enable integrity validation and encryption (confidentiality of data), but the AP(s) only will have authorization to do integrity validation, and not to decrypt a beacon telemetry message and obtain the data.

As shown at 450, the management server 160 initiates an infrastructure integrity key update to rekey infrastructure (APs and intermediate hop devices) that are authorized to validate telemetry broadcast messages when a compatible beacon device is detected. At 455, the management server 160 sends the N H-keys only to the APs entrusted with the integrity check for the beacon device. At 460, the management server 160 sends the N H-keys to the intermediate hop devices that are authorized to validate the beacon telemetry broadcasts.

Thus, as depicted in FIG. 4, there is a two-part key management: one for the authorized APs (what set of APs are authorized to validate a beacon device); and one that is power-aware with respect to the beacon device. The topology awareness may also involve determining which intermediate hop devices (not the serving AP) should be authorized to validate beacon broadcasts.

Detecting Unauthorized Connection Requests in Overlay Beacon Network

Beacon advertisements are detected by APs and sent over secure channels through intermediate hops to the management server 160. The management server 160 knows approximately (within 5 m 90% of the time) where each beacon device is located and what advertisements they are broadcasting. The management server 160 also monitors all connection requests to beacon devices which are compliant to a particular protocol in its overlay beacon network.

In one aspect, a particular protocol may be provided (called Location Telemetry Exchange (LTX) herein) that specifies packet formats for any third party vendor BLE 4.2/5.0 tag or Wi-Fi tag to seamlessly communicate to the management server 160 for location, telemetry and management solutions via the BLE-enabled APs. The packet formats may abide by a standard BLE sig Generic Access Profile (GAP) advertisement for broadcasts and BLE sig General Attributes (GATT) LE secure channels for point-to-point connections for beacon devices. As a part of the LTX on-boarding workflow, beacon or tag vendors at the time of manufacturing the device would program a 16-byte random value as a key inside the device and then pre-share the key for that device to management server though a secure Hypertext Transfer Protocol (HTTP) REST endpoint, as described above in connection with FIGS. 1 and 2.

When a customer receives a beacon device, the customer turns it on under supervision in a secure location or during a secure time period. When the management server 160 detects that the beacon broadcasts a LTX packet format for the first time, using the pre-shared key, the management server 160 rotates the key securely using LE secure connections (resistant to a man-in-the-middle attack) and establishes a new random key with the beacon device, as described above. Then, the management server 160 can program or configure the beacon device using the newly established key and adjust the advertisement payloads of the beacon.

Once the key initialization has been completed, a method of detecting unauthorized connection requests (i.e., rogue devices attempting to pair to a beacon device) can be provided using a combination of two different techniques: Beacon Initiated and Network Initiated.

Beacon Initiated

In the beacon initiated method, whenever a beacon receives a connection request (from a mobile application or any device) it uses a Secure LE connection to verify if the key used for establishing the connection is valid or not through a 3-way handshake. If it determines that the key agreement protocol is failing multiple times (for example, twice), it immediately suspects a brute forcing attack and emits a panic telemetry signal with the "tampered bit" set. The panic telemetry signal is an unencrypted broadcast with high priority which is received by APs scanning for BLE broadcasts. The APs then inform the management server 160 that a panic tampered signal has been broadcasted by a beacon.

However, the management server 160 does not take any action based solely on the received panic telemetry signal. Since the panic telemetry signal is broadcasted in clear text it is possible for an attacker to spoof the signal and generate false alarms. The management server 160 correlates the panic telemetry signal with a network initiated unauthenticated connection detection (described below) to generate alerts.

Network Initiated

In the network initiated method, the BLE chip in the AP is constantly scanning for Bluetooth signals. Hence, the AP is able to eavesdrop on Bluetooth connection requests between devices. A BLE connection request packet has the source MAC address and the destination MAC address in clear text. As a result, multiple APs will report that a device with MACaddress A is requesting a connection to device with MACaddress B. If MACaddress B is in fact a beacon device that is being managed by the management server 160, MACaddress A can only be that of an authorized AP. If MACaddress A is not an authorized access point MAC address, the management server 160 immediately knows that some rogue device is trying to connect to the managed beacon.

Thus, by correlating the beacon device panic telemetry signal with the network unauthenticated request detection, the management server 160 can be absolutely certain that a rogue device is trying to connect to a managed beacon.

The rekey process may be triggered if some form of an unauthorized brute force attempt of pairing to a beacon device is discovered. Again, the management server 160 stores information for the location of all the APs and beacon devices in the network topology which are within connectable distance of a legitimate/authorized beacon device and which have the pairing key needed to connect to a given beacon device. As a result, if a legitimate beacon device raises a security telemetry event associated with unauthorized connection requests form a device, the management server 160 can validate if the device has rights to connect to the legitimate beacon device and act accordingly.

The key update sent to a beacon encrypts the packet using one of the uncompromised keys from the previous key-table. If rekey is needed due to a periodic rekey, the current key may be used. If a breach necessitated the rekey, then one of the older keys can be used. This is to ensure that the infrastructure cannot recover the encryption keys.

Figure 5:
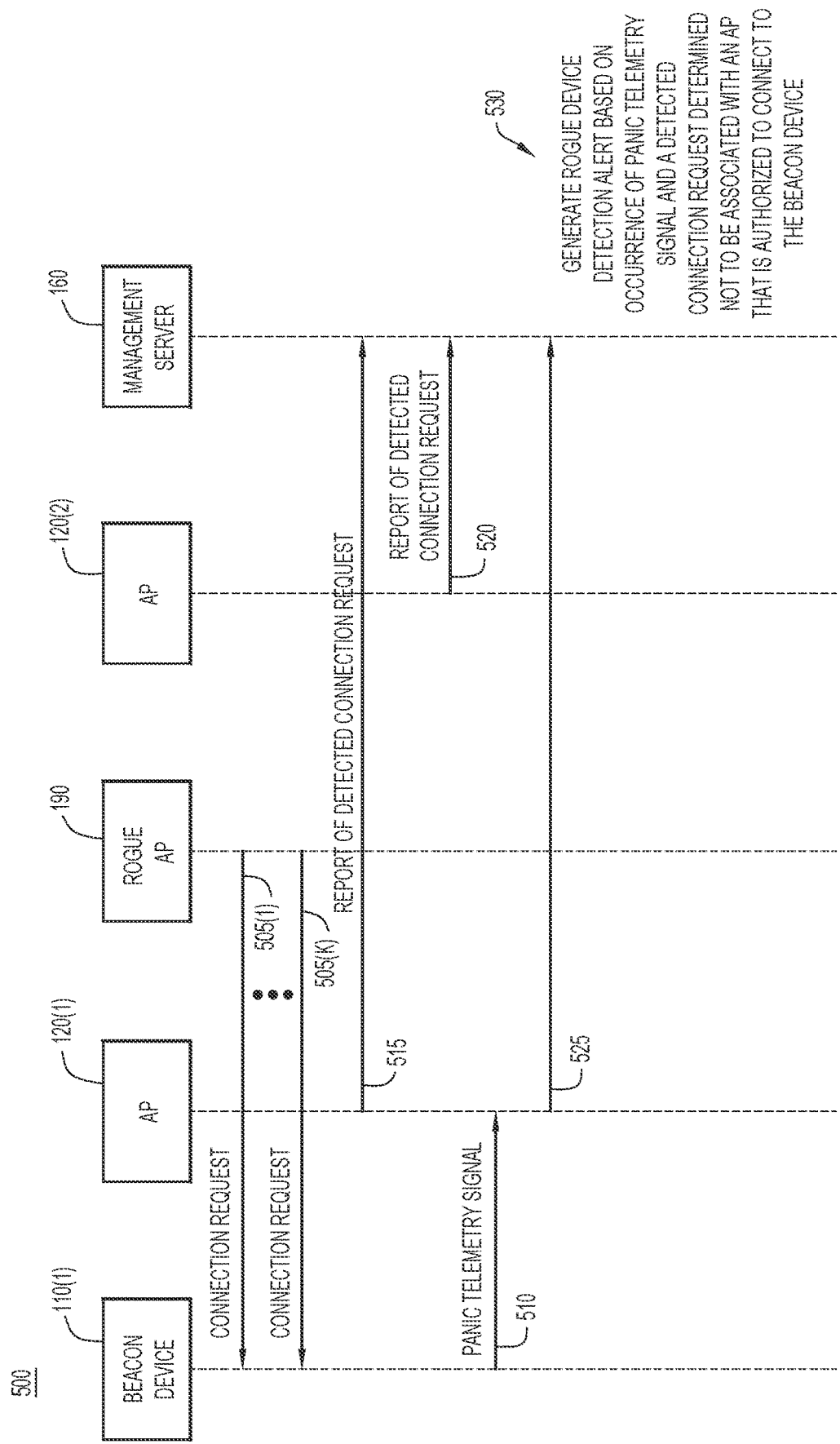
FIG. 5 is a sequence diagram depicting a process to detect unauthorized connection attempts to a beacon device, according to an example embodiment.

Reference is now made to FIG. 5. FIG. 5 illustrates a sequence of operations associated with the method to detect an unauthorized detection attempt to a beacon device. The beacon device under attack is shown at 110(1), its serving AP is shown at 120(1), the attacking device ("rogue AP") is shown at 190 and another AP that can detect connection requests sent to the beacon device 110(1) is shown at 120(2). There may be additional APs that can detect connection requests to the beacon device 110(1), but for simplicity only two such APs 120(1) and 120(2) are shown in FIG. 5. It is to be further noted that order (from top to bottom of messaging arrows in FIG. 5 is not intended to indicate the relative timing of occurrence of the messaging.

As shown at 505(1)-505(K), the rogue AP 190 sends connection requests to the beacon device 110(1). The beacon device 110(1) verifies whether the key used by the rogue AP 190 for establishing the connection is valid through a 3-way handshake. If the beacon device 110(1) determines that the key agreement protocol is failing multiple times (for example, twice), it immediately suspects a brute forcing attack and at 510 emits a panic telemetry signal with the "tampered bit" set. The panic telemetry signal is an unencrypted broadcast with high priority which is received by APs scanning for BLE broadcasts. Meanwhile, the connection request attempts by the rogue AP 190 to the beacon device 110(1) are detected by other APs in the vicinity of the beacon device 110(1). For example, AP 120(1) and AP 120(2) detect the connection request attempts 505(1)-505(K) by the rogue AP 190. The connection request attempts include a MAC address of the source device sending the connection request (e.g., the MAC address of the rogue AP 190) and the destination MAC address of the beacon device 110(1). At 515 and 520, the APs 120(1) and 120(2) send to the management server 160 reports of the detected connection requests. At 525, the serving AP 120(1), for example, forwards the panic telemetry signal to the management server 160, or otherwise sends a notification to the management server 160 that a panic telemetry signal has been broadcasted by the beacon device 110(1). The panic telemetry signal is sent in clear text, and thus is subject to tampering. At 530, the management server 160 generates a rogue device detection alert based on occurrence of the panic telemetry signal and a detected connection request (to the beacon device 110(1)) that is determined not to be associated with an AP that is authorized to connect to the beacon device 110(1). Thus, the management server 160 may rely on both on a panic notification from a beacon device and information obtained in the infrastructure about connection requests made to that beacon device.

Figure 6:
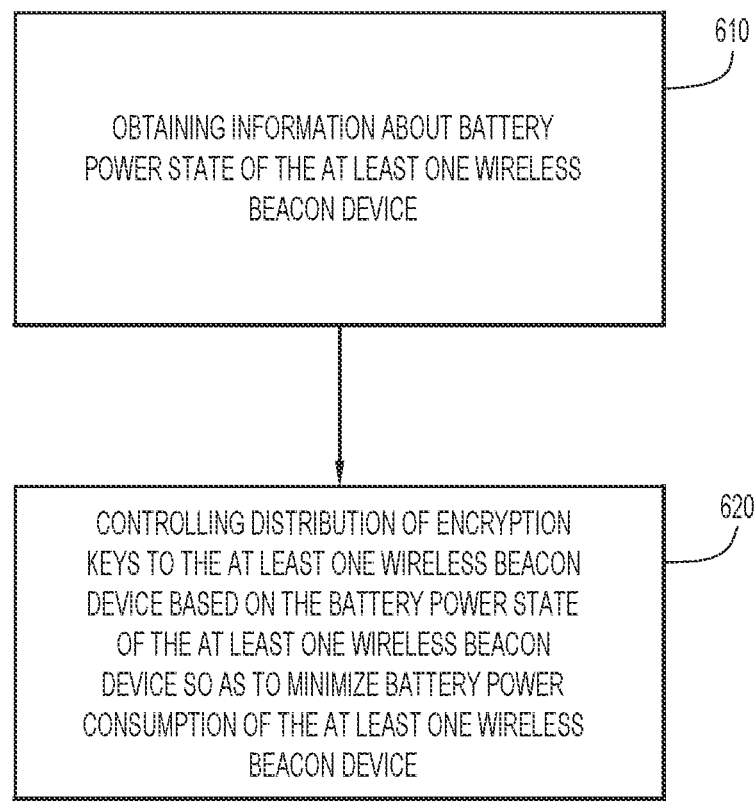
FIG. 6 is a flow chart depicting operations performed by a management server to manage key distribution to beacon devices, access points and intermediate hop devices, according to an example embodiment.

Reference is now made to FIG. 6, which illustrates a flow chart depicting operations of a method 600 performed by the management server 160, according to an example embodiment. The method 600 is performed by a server (e.g., management server 160) that manages at least one wireless beacon device configured to encrypt and broadcast telemetry messages that include data from one or more sensors. At 610, the server obtains information about battery power state of the at least one wireless beacon device. At 620, the server controls distribution (management) of encryption keys to the at least one wireless beacon device based on the battery power state of the at least one wireless beacon device so as to minimize battery power consumption of the at least one wireless beacon device.

As described above in connection with FIG. 2, the obtaining operation 610 may further include obtaining information about the capabilities of the beacon device to ensure that the management server 160 uses the appropriate security configuration (e.g., key size and cryptographic algorithm) to provision the beacon device.

The controlling operation 620 may include controlling distribution of at least one of a number of keys or a periodicity at which the keys are distributed to the at least one wireless beacon device. For example, the server may distribute a larger number of keys on a less frequent basis as the battery power state of the at least one wireless beacon device becomes depleted so as to reduce battery power consumption by the at least one wireless beacon device for key management.

Furthermore, as described above in connection with FIG. 4, the method may further include determining at least one wireless access point that is in range of the at least one wireless beacon device and which is authorized to validate broadcasted messages from the at least one beacon device. The controlling operation 620 thus may include controlling distribution of the encryption keys to the at least one wireless beacon device and distribution of hash keys to the at least one wireless access point to enable encryption of broadcast telemetry messages by the at least one wireless beacon device, but only integrity validation using the hash keys by the at least one wireless access point of the broadcast telemetry messages. Further still, the controlling operation 620 may include controlling distribution of the hash keys to one or more intermediate hop devices which are authorized to validate broadcast telemetry messages of the at least one wireless beacon device; and revoking the hash keys for one or more intermediate hop devices when it is determined that the one or more intermediate hop devices are not authorized to validate broadcast telemetry messages of the at least one wireless beacon device.

The operation 610 of obtaining may, in one form, include monitoring a broadcast telemetry message that includes a field that indicates a battery power level of the at least one wireless beacon device. In another form, the operation 610 of obtaining may include the server querying the at least one wireless beacon device via a secure connection to report its battery power state.

Turning to FIG. 7, a flow chart is shown of a method 700 performed by the management server 160 in accordance with another example embodiment to detect unauthorized connection requests to a wireless beacon device. The method 700 is performed by a server that manages at least one wireless beacon device configured to encrypt and broadcast telemetry messages that include data from one or more sensors. The telemetry messages may include an encrypted portion for payload data and an unencrypted portion for routing priority information. At 710, the server obtains, from a plurality of wireless access points that detect connection requests to the at least one wireless beacon device, reports including a media access control address for a source and a destination of the detected connection requests. At 720, the server determines whether the media access control address associated with a detected connection request is associated with a wireless access point not authorized to connect to the at least one beacon device. At 730, the server may generate a rogue device detection alert based on a detected connection request determined not to be associated with a wireless access point authorized to connect to the at least one wireless beacon device. In one form, the server may initiate a rekey procedure (as described above in connection with FIG. 4) upon detection of such an attack.

As explained above, the method 700 may be based on a two-pronged approach that also relies on a beacon broadcasted panic signal. Thus, the server may obtain from a wireless access point that is in communication with the at least one wireless beacon device, an indication that a panic telemetry signal has been transmitted by the at least one wireless beacon device. The panic telemetry signal indicates that a key agreement protocol exchange associated with a connection request to the at least one wireless beacon device has failed a predetermined number of times. The panic telemetry signal is broadcasted by the at least one wireless beacon device in clear text. In this case, the server generates the rogue device detection alert is based further on occurrence of the panic telemetry signal.

In summary, as beacon devices become deployed more, they can be used to identify people (e.g., BLE badges), transmit sensitive data (e.g., sensor measurements of medical devices) and are becoming an important part of automation, education, healthcare and retail businesses. However, by default, beacon telemetry broadcasts are unencrypted. In accordance with one aspect, techniques are provided to reliably encrypt beacon telemetry broadcasts (e.g., BLE telemetry broadcasts) so that sensitive information can only be read by authorized entities.

Moreover by decoupling confidentiality (encryption) from integrity (hash-based data integrity checks performed by APs and intermediate hop devices) as described above, Authenticated Encryption with Associated Data (AEAD) algorithms need not be used. This is to allow only the authorized application (e.g., the management server) to decrypt the encrypted payload. However, other optimizations may still be performed, such as priority scheduling and routing by the intermediate hops (like APs) that can read certain data (like a priority bit setting) but cannot read sensitive information (like identities in the encrypted payload) while also allowing these intermediate hops to ensure integrity of these packets. Thus, the intermediate hops can validate the MIC but not decrypt the payload, while the cloud hosted application (management server 160) can both decrypt the encrypted payload and validate the MIC.

In addition, connections to beacons are usually not extremely secure and can be subject to brute force attacks in many cases, thus making a beacon transmit unintended advertisements or becoming a host of a virus. In accordance with another aspect, activity in a beacon network is monitored and if an unauthorized device is trying to connect to a beacon device, an alert is generated (and sent to a network administrator).

When a connection to a beacon device is being established, the beacon device acts as a peripheral and the connecting device (either a mobile application, an AP or some other BLE capable device) acts as a central node to initiate the connection. Since the beacon device is a peripheral, when a central node initiates a connection, the beacon device will try to connect to it. However, when the beacon device sees that a device is trying to connect to it and is failing for, two successive times for example, it immediately becomes wary and broadcasts a panic telemetry signal.

However, even if the "beacon initiated" method is not used, the "network initiated" method by itself is sufficient to determine if the beacon is being connected to by an unauthorized device. The beacon initiated method is just an aid to the infrastructure based detection.

The network initiated method depends on the fact that some form of trust has been established between the infrastructure and the beacon, and the infrastructure (in this case the management server) knows the possible AP MAC addresses which are authorized to connect to the beacon or if it has recently issued such an authorization. Thus, when the devices in the network detect that MACaddress A is trying to connect to a beacon or if the beacon broadcasts a panic telemetry signal saying MACaddress A is trying to connect to it and failing, the network can immediately look up to determine (a) the MAC address is that of an authorized AP or not; and (b) if yes, then whether it has been recently authorized to connect to the beacon or not.

The management server 160 is the intelligence for overlay beacon management. The management server 160 stores the following information:

1. The set of BLE capable APs which can manage the beacon network.

2. The keys through which the infrastructure can manage the beacon devices.

3. The keys through which the beacon devices encrypt broadcasts if broadcast encryption is enabled.

4. Policies associated with the APs to determine which access point is in charge of managing the beacon at a certain period of time (based on the computed beacon location).

By adopting a two-pronged approach to determine unauthorized connection requests/brute forcing beacon connections, there is no way for a malicious device to avoid being detected, even if it tries to spoof the beacon, the AP or the panic telemetry packets.

Figure 8:
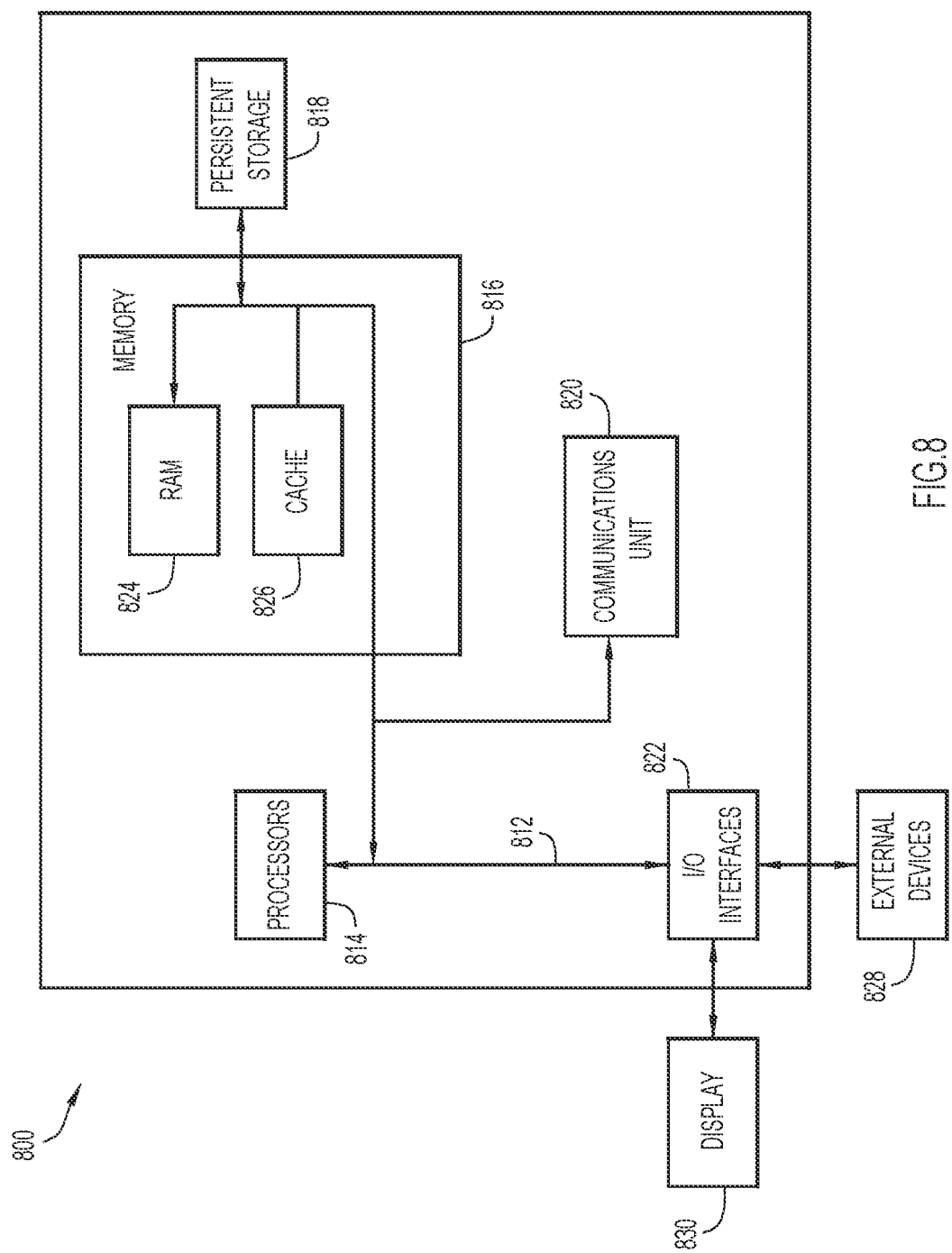
FIG. 8 is a block diagram of a management server configured to perform the key management techniques and unauthorized connection detection techniques, according to an example embodiment.

FIG. 8 illustrates a hardware block diagram of a computing device 800 that may serve as the management server 160 described herein. It should be appreciated that FIG. 5 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 814, cause the computing device 800 to perform the operations of the management server 160 described herein in connection with the accompanying figures. In addition, the memory 816 stores the aforementioned information that the management server 160 uses to management the beacon network, such as key-tables, battery power state of beacon devices (updated over time), authorized beacon devices, authorized APs and other intermediate hop devices, etc.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, an method is provided comprising: at a server that manages at least one wireless beacon device configured to encrypt and broadcast telemetry messages that include data from one or more sensors, obtaining information about battery power state of the at least one wireless beacon device; and controlling distribution of encryption keys to the at least one wireless beacon device based on the battery power state of the beacon device so as to minimize battery power consumption of the at least one wireless beacon device.

In another form, an apparatus is provided that comprises a communication interface configured to enable network communications; and a processor coupled to the communication interface, wherein the processor is configured to: obtain information about battery power state of the at least one wireless beacon device; and control distribution of encryption keys to the at least one wireless beacon device based on the battery power state of the at least one wireless beacon device so as to minimize battery power consumption of the at least one wireless beacon device.

In still another form, one or more non-transitory computer readable storage media are provided that are encoded with software comprising computer executable instructions by a processor running on a server that manages at least one wireless beacon device configured to encrypt and broadcast telemetry messages that include data from one or more sensors, the server is operable to perform operations including: obtaining information about battery power state of the at least one wireless beacon device; and controlling distribution of encryption keys to the at least one wireless beacon device based on the battery power state of the beacon device so as to minimize battery power consumption of the at least one wireless beacon device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a server that manages at least one wireless beacon device configured to encrypt and broadcast telemetry messages that include data from one or more sensors, obtaining information about a battery power state indicative of a battery power level of the at least one wireless beacon device; and
   controlling distribution of encryption keys to the at least one wireless beacon device in periodic key updates based on the battery power state indicative of the battery power level, including controlling distribution of the encryption keys in the periodic key updates such that a larger set of encryption keys are distributed on a less frequent basis as the battery power state indicative of the battery power level is reduced.

2. The method of claim 1, wherein controlling includes controlling distribution of a number of encryption keys and a periodicity at which the encryption keys are distributed to the at least one wireless beacon device in the periodic key updates.

3. The method of claim 1, wherein controlling includes controlling distribution of the encryption keys in the periodic key updates so as to reduce battery power consumption of the at least one wireless beacon device.

4. The method of claim 1, further comprising:
   determining at least one wireless access point that is in range of the at least one wireless beacon device and which is authorized to validate broadcasted messages from the at least one wireless beacon device;
   wherein controlling includes controlling distribution of the encryption keys to the at least one wireless beacon device and distribution of hash keys to the at least one wireless access point to enable encryption of broadcast telemetry messages by the at least one wireless beacon device but only integrity validation using the hash keys by the at least one wireless access point of the broadcast telemetry messages.

5. The method of claim 4, wherein controlling further includes controlling distribution of the hash keys to one or more intermediate hop devices which are authorized to validate broadcast telemetry messages of the at least one wireless beacon device; and revoking the hash keys for one or more intermediate hop devices when it is determined that the one or more intermediate hop devices are not authorized to validate broadcast telemetry messages of the at least one wireless beacon device.

6. The method of claim 1, wherein obtaining includes monitoring a broadcast telemetry message that includes a field that indicates the battery power level of the at least one wireless beacon device.

7. The method of claim 1, wherein obtaining includes the server querying the at least one wireless beacon device via a secure connection to report its battery power state.

8. The method of claim 1, further comprising:
obtaining, from a plurality of wireless access points that detect connection requests to the at least one wireless beacon device, reports including a media access control address for a source and a destination of the detected connection requests;
determining whether the media access control address associated with a detected connection request is associated with a wireless access point not authorized to connect to the at least one wireless beacon device; and
generating a rogue device detection alert based on a detected connection request determined not to be associated with a wireless access point authorized to connect to the at least one wireless beacon device.

9. The method of claim 8, further comprising:
obtaining from a wireless access point that is in communication with the at least one wireless beacon device, an indication that a panic telemetry signal has been transmitted by the at least one wireless beacon device, the panic telemetry signal indicating that a key agreement protocol exchange associated with a connection request to the at least one wireless beacon device has failed a predetermined number of times, wherein the panic telemetry signal is broadcasted by the at least one wireless beacon device in clear text;
wherein generating the rogue device detection alert is based further on occurrence of the panic telemetry signal.

10. The method of claim 1, wherein the telemetry messages include an encrypted portion for payload data and an unencrypted portion for routing priority information.

11. An apparatus comprising:
a communication interface configured to enable network communications;
a memory for storing instructions; and
a processor coupled to the communication interface and the memory, wherein the processor is configured to execute the instructions to:
obtain information about battery power state indicative of a battery power level of at least one wireless beacon device; and
control distribution of encryption keys to the at least one wireless beacon device in periodic key updates based on the battery power state indicative of the battery power level, including controlling distribution of the encryption keys in the periodic key updates such that a larger set of encryption keys are distributed on a less frequent basis as the battery power state indicative of the battery power level is reduced.

12. The apparatus of claim 11, wherein the processor is configured to execute the instructions further to control distribution of a number of encryption keys and a periodicity at which the encryption keys are distributed to the at least one wireless beacon device in the periodic key updates.

13. The apparatus of claim 11, wherein the processor is configured to execute the instructions further to control distribution of the encryption keys in the periodic key updates so as to reduce battery power consumption of the at least one wireless beacon device.

14. The apparatus of claim 11, wherein the processor is configured to execute the instructions further to:
determine at least one wireless access point that is in range of the at least one wireless beacon device and which is authorized to validate broadcasted messages from the at least one wireless beacon device; and
control distribution of the encryption keys to the at least one wireless beacon device and distribution of hash keys to the at least one wireless access point to enable encryption of broadcast telemetry messages by the at least one wireless beacon device but only integrity validation using the hash keys by the at least one wireless access point of the broadcast telemetry messages.

15. The apparatus of claim 14, wherein the processor is configured to execute the instructions further to control distribution of the hash keys to one or more intermediate hop devices which are authorized to validate broadcast telemetry messages of the at least one wireless beacon device.

16. The apparatus of claim 11, wherein the processor is configured to execute the instructions further to:
obtain, from a plurality of wireless access points that detect connection requests to the at least one wireless beacon device, reports including a media access control address for a source and a destination of the detected connection requests;
determine whether the media access control address associated with a detected connection request is associated with a wireless access point not authorized to connect to the at least one wireless beacon device; and
generate a rogue device detection alert based on a detected connection request determined not to be associated with a wireless access point authorized to connect to the at least one wireless beacon device.

17. The apparatus of claim 16, wherein the processor is configured to execute the instructions further to:
obtain from a wireless access point that is in communication with the at least one wireless beacon device, an indication that a panic telemetry signal has been transmitted by the at least one wireless beacon device, the panic telemetry signal indicating that a key agreement protocol exchange associated with a connection request to the at least one wireless beacon device has failed a predetermined number of times, wherein the panic telemetry signal is broadcasted by the at least one wireless beacon device in clear text; and
generate the rogue device detection alert is based further on occurrence of the panic telemetry signal.

18. One or more non-transitory computer readable storage media encoded with software comprising computer executable instructions by a processor running on a server that manages at least one wireless beacon device configured to encrypt and broadcast telemetry messages that include data from one or more sensors, the server is operable to perform operations including:

obtaining information about a battery power state indicative of a battery power level of the at least one wireless beacon device; and controlling distribution of encryption keys to the at least one wireless beacon device in periodic key updates based on the battery power state indicative of the battery power level, including controlling distribution of the encryption keys in the periodic key updates such that a larger set of encryption keys are distributed on a less frequent basis as the battery power state indicative of the battery power level is reduced.

19. The non-transitory computer readable storage media of claim 18, wherein the instructions operable for controlling include instructions for controlling distribution of a number of encryption keys and a periodicity at which the encryption keys are distributed to the at least one wireless beacon device in the periodic key updates.

20. The non-transitory computer readable storage media of claim 18, wherein the instructions operable for controlling include instructions for controlling distribution of the encryption keys in the periodic key updates so as to reduce battery power consumption of the at least one wireless beacon device.

* * * * *